US008465632B2

(12) United States Patent
Shirvanian (10) Patent No.: US 8,465,632 B2
(45) Date of Patent: Jun. 18, 2013

(54) THIN FILM CATALYST ON POROUS MEDIA AND ELECTROCHEMICAL CELL EMPLOYING THE SAME

(75) Inventor: Alireza Pezhman Shirvanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 12/981,596

(22) Filed: Dec. 30, 2010

(65) Prior Publication Data

US 2011/0139610 A1 Jun. 16, 2011

(51) Int. Cl.
*H01M 4/92* (2006.01)
*C25B 9/00* (2006.01)
*B01J 35/10* (2006.01)

(52) U.S. Cl.
USPC .......... 204/275.1; 502/100; 429/524

(58) Field of Classification Search
USPC .............. 204/275.1; 502/100, 2; 429/524, 429/526, 527
See application file for complete search history.

(56) References Cited

U.S. PATENT DOCUMENTS

| | | | |
|---|---|---|---|
| 5,211,984 A | 5/1993 | Wilson | |
| 5,759,712 A | 6/1998 | Hockaday | |
| 2003/0039874 A1 | 2/2003 | Jankowski et al. | |
| 2004/0053100 A1 | 3/2004 | Stanley et al. | |
| 2005/0053826 A1 | 3/2005 | Wang et al. | |
| 2007/0105005 A1 | 5/2007 | Tolmachev | |
| 2009/0053565 A1 | 2/2009 | Iacovelli | |
| 2009/0092879 A1 | 4/2009 | Kreidler et al. | |
| 2009/0218311 A1 | 9/2009 | Jiang et al. | |
| 2010/0047662 A1 | 2/2010 | Shirvanian et al. | |
| 2010/0062317 A1 | 3/2010 | Selcuk | |
| 2011/0166012 A1* | 7/2011 | Yang et al. | 502/159 |

FOREIGN PATENT DOCUMENTS

| | | |
|---|---|---|
| DE | 19914661 | 10/2000 |
| EP | 1873849 | 2/2008 |

* cited by examiner

*Primary Examiner* — Mark F Huff
*Assistant Examiner* — Monique Wills
(74) *Attorney, Agent, or Firm* — Damian Porcari; Brooks Kushman P.C.

(57) ABSTRACT

In one embodiment, a catalyst assembly includes a porous substrate material including a substrate bulk and an external surface, the substrate bulk including a network of pores for diffusing fluids there-through, and a two dimension (2-D) extensive catalyst supported on at least a portion of the network of pores to provide a substantially constant catalyst concentration profile along a thickness dimension of the substrate bulk. In certain instances, the network of pores includes an internal pore surface for supporting at least a portion of the 2-D extensive catalyst.

19 Claims, 8 Drawing Sheets

THIN FILM CATALYST ON POROUS MEDIA AND ELECTROCHEMICAL CELL EMPLOYING THE SAME

BACKGROUND

1. Technical Field

One or more embodiments of this invention relate to a thin film catalyst on porous media and electrochemical cell employing the same.

2. Background Art

While reliability and working lifetime have been considered for utilizing fuel cell (FC) technologies in automotive applications, catalyst activity remains one factor that needs thorough consideration for commercializing fuel cell technologies and in particular fuel cell vehicles. Efforts have been made with a focus on developing fuel cell catalysts having desirable electro-catalytic oxygen reduction reaction (ORR). To this end, fuel cell catalysts such as what is known as the core-shell nano-particles, show some improvement over pure platinum nano-particles and/or pure platinum alloys nano-particles supported on carbon. However, these conventional core-shell catalysts, by virtue of being nano-particles, are still prone to agglomeration, dissolution and durability issues.

SUMMARY

According to one aspect of the present invention, a catalyst assembly is provided. In one embodiment, the catalyst assembly includes a porous substrate material including a substrate bulk and an external surface, and a two dimension (2-D) extensive catalyst supported on at least a portion of the network of pores to provide a substantially constant catalyst concentration profile along a thickness dimension of the substrate bulk. In certain instances, the network of pores includes an internal pore surface for supporting at least a portion of the 2-D extensive catalyst. In certain instances, the 2-D extensive catalyst has a thickness dimension of 1 to 50 atomic layers. In certain other instances, the substrate material is electronically conductive.

In another embodiment, the catalyst assembly further includes a volume of electrolyte adjacent the porous substrate material. In certain instances, the volume of electrolyte has a solvent content of no greater than 5 percent by weight.

In yet another embodiment, the substrate bulk includes first and second substrate layers having first and second average pore sizes, respectively, the first average pore size being different from the second average pore size. In certain instances, the substrate bulk further includes a third substrate layer disposed next to the second substrate layer and having a third average pore size, the second substrate being positioned between the first and the third substrate layers. In certain other instances, the first average pore size is smaller than the second average pore size, and the second average pore size is smaller than the third average pore size. In yet certain other instances, the 2-D extensive catalyst contacts one or more pores of both the first and second substrate layers.

In yet another embodiment, the 2-D catalyst includes two or more spaced apart catalyst patches each contacting the internal pore surface.

In yet another embodiment, the substrate bulk further includes a plurality of wires extending longitudinally from the internal pore surface. In certain instances, the 2-D extensive catalyst contacts at least a portion of the plurality of wires.

According another aspect, there is provided an electrochemical cell including a porous substrate material including a substrate bulk and an external surface, the external surface includes first and second spaced apart surface portions, the porous substrate material including a continuous fluid flow conduit extending from the first surface portion to the second surface portion for transporting fluids through the porous substrate material.

BRIEF DESCRIPTION OF THE DRAWINGS

FIG. 4B1 depicts a plan view of FIG. 4A taken along the line 4B1-4B1;

FIG. 4B2 depicts an enlarged sectional view of FIG. 4B1;

FIG. 4B3 depicts an enlarged sectional view of FIG. 4B2;

DETAILED DESCRIPTION OF ONE OR MORE EMBODIMENTS

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Also, unless expressly stated to the contrary, the description of a group or class of material as suitable or preferred for a given purpose in connection with the invention implies that mixtures of any two or more members of the group or class may be equally suitable or preferred.

In one or more embodiments, the present invention provides a catalyst assembly and an electrochemical cell employing a catalyst with improved catalyst stability and hence reduced system cost relative to conventional platinum nano-particles on carbon. As will be detailed herein elsewhere, the catalyst is deposited on a porous substrate as a thin film and/or a number of thin films contacting the pores of the porous substrate. In certain instances, the electrochemical cell is provided such that the catalyst and one or both of the gas flow field and the gas diffusion layer is integrated into one piece construction, or a monolith.

In one or more embodiments, the term "electrochemical cell" refers to a device capable of either deriving electrical energy from chemical reactions, or facilitating chemical reactions through the introduction of electrical energy. The electrochemical cell may include a non-rechargeable primary cell, a rechargeable secondary cell, or combinations thereof. For primary cells, when the initial supply of reactants is exhausted, energy cannot be readily restored to the electrochemical cell by electrical means. For secondary cells, chemical reactions may be reversed by supplying electrical energy to the cell, restoring their original composition. One non-limiting example of the electrochemical cell is a fuel cell, and a polymer electrolyte membrane fuel cell (PEMFC) in certain particular instances.

Figure 1:
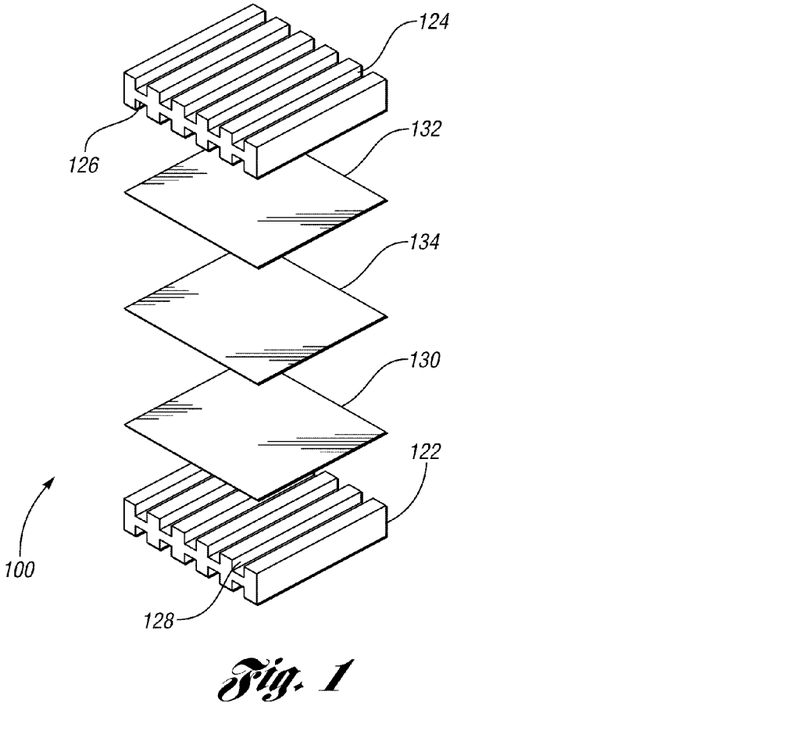
FIG. 1 depicts a perspective view of an electrochemical cell according to one embodiment.

According to one aspect of the present invention, and as depicted in FIG. 1, an electrochemical cell such as a PEMFC is generally shown at 100. In one embodiment, and as depicted in FIG. 1, the electrochemical cell 100 includes a pair of bipolar plates 122 and 124 having flow channels 126 and 128 formed thereupon, respectively. The flow channels 126, 128 may be formed at a predetermined interval on both sides of each of the bipolar plates 122 and 124. The fuel cell 100 also includes an ionic exchange membrane 134 disposed between the bipolar plates 122 and 124. A first electrode such as a fuel electrode 130 is disposed between the ionic exchange membrane 134 and the bipolar plate 122, and a second electrode such as an air electrode 132 is disposed between the ionic exchange membrane 134 and the bipolar plate 124. The bipolar plates 122 and 124 electrically contact the first and second electrodes 130 and 132, respectively, and reduce or prevent fuel and air (an oxidizer) from being mixed. In certain instances, the bipolar plate 124 may be positioned with a 90-degree turn relative to the bipolar plate 122.

Figure 2:
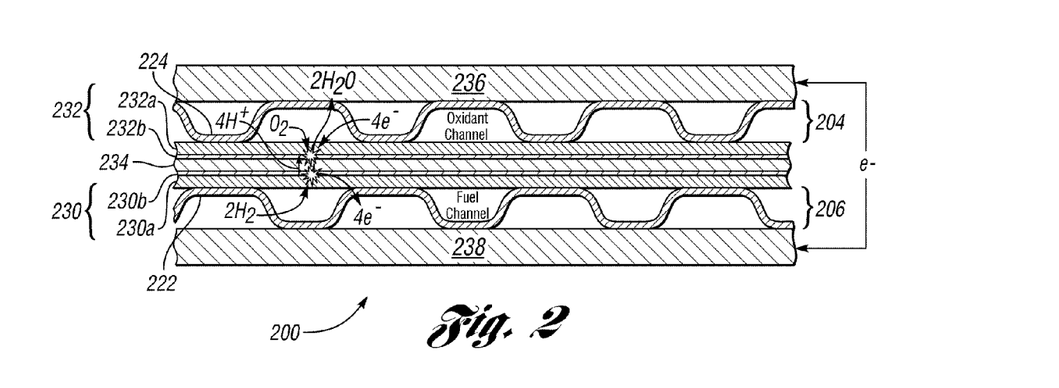
FIG. 2 depicts a cross-sectional view of the electrochemical cell of FIG. 1.

In another embodiment, and as depicted in FIG. 2, a cross-sectional view of the electrochemical cell 100 of FIG. 1 is generally shown at 200. An ion exchange membrane 234 is flanked by first and second electrodes 230, 232. In this configuration, the first electrode 230 includes a first gas diffusion layer 230a and a first catalyst layer 230b; and the second electrode 232 includes a second gas diffusion layer 232a and a second catalyst layer 232b. External to the electrodes 230, 232 are first and second bipolar plates 222, 224, respectively. Further external to the bipolar plates 222, 224 are first and second current collection plates 238, 236, respectively.

In operation, and as depicted in FIG. 2, hydrogen-containing fuel is brought into contact with the first electrode 230; and oxygen-containing gas such as air is brought into contact with the second electrode 232. Hydrogen ions such as protons are moved to the second electrode 232 side through the ionic exchange membrane 234, while the electrons move via on external circuit (not shown) to the second electrode 232 side. In the second electrode 232, oxygen, electrons, and hydrogen ions react to generate water.

When reactant gases are fed to respective electrodes 230, 232, it is believed that triple phase interface involving a gaseous phase (reactant gas), an ionically conducting phase, and an electrically conducting phase is formed. As depicted in FIG. 2, the electrochemical reactions include the following: On the first electrode side $H_2 \rightarrow 2H^+ + 2e^-$. On the second electrode side: $\frac{1}{2} O_2 + 2H^+ + 2e^- \rightarrow H_2O$. The hydrogen ions ($H^+$) formed on the first electrode side migrate to the second electrode side through the solid electrolyte membrane, while electrons migrate to the second electrode side through an external load. On the other hand, on the second electrode side, oxygen contained in the oxidizing agent gas reacts with the $H^+$ ions and electrons coming from the first electrode side to form water. Thus, the fuel cell generates direct electric current from hydrogen and oxygen while forming water.

Figure 3A:
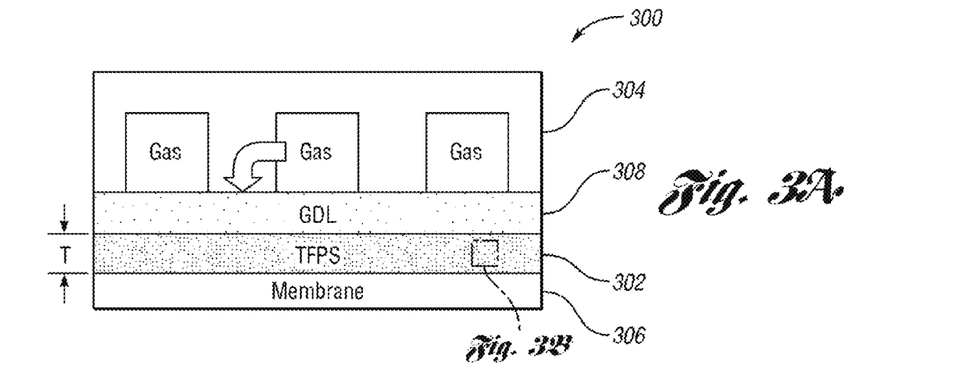
FIG. 3A depicts a cross-sectional view of an electrochemical cell according to another embodiment.
Figure 3B:
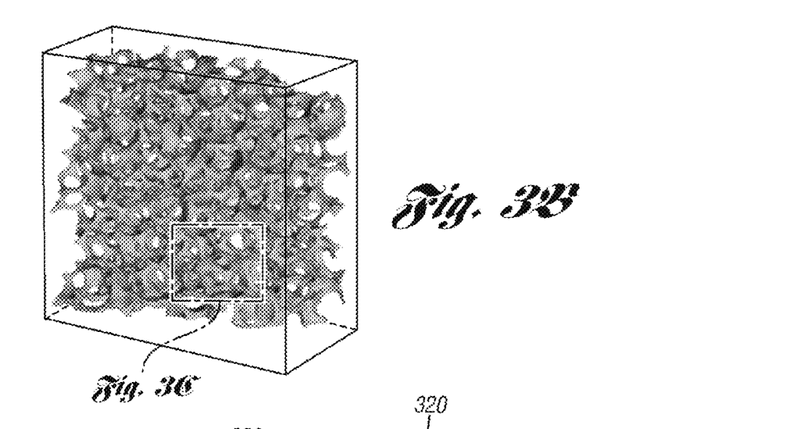
FIG. 3B depicts an enlarged sectional view of FIG. 3A.
Figure 3C:
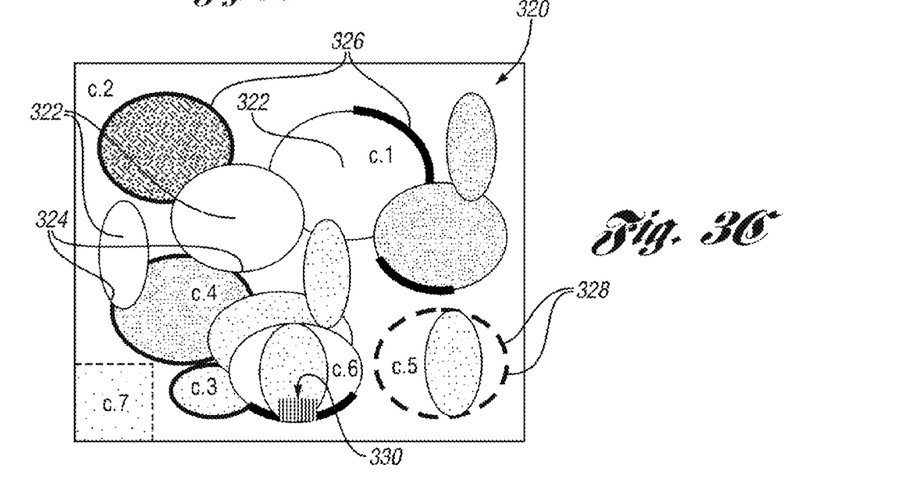
FIG. 3C depicts an enlarged sectional view of FIG. 3B.

FIG. 3A depicts a cross-sectional view of an electrochemical cell according to another embodiment. As depicted in FIG. 3A, an electrochemical cell generally shown at 300 includes a catalyst assembly 302 shown in relation to a gas flow field 304, an ion exchange membrane 306, and optionally a gas diffusion layer 308. In certain instances, the gas flow field 304 can be equivalent to 204, 206 of FIG. 2. FIG. 3B depicts an enlarged view of a portion 3A of the catalyst assembly 302. FIG. 3C depicts an enlarged view of a portion 3B shown in FIG. 3B. As depicted in FIG. 3C, the catalyst assembly 302 includes a substrate material defining a substrate bulk 320 and a network of pores 322 positioned on or within the substrate bulk 320 and collectively having an internal pore surface 324. One or more of pores 322 may be configured to pass molecules of water and reactant gases. The catalyst assembly 302 further includes a two dimension (2-D) extensive catalyst 326 contacting at least a portion of the internal pore surface 324. In certain instances, the 2-D extensive catalyst 326 is configured as a 2-D extensive catalyst thin film.

In one or more embodiments, the term "2-D extensive" refers to that the catalyst 326 is configured as being x-axis and/or y-axis extensive relative to its thickness dimension or z-axis. In this design, the 2-D extensive catalyst 326 behaves more like pseudo-bulk catalyst relative to catalyst nano-particles. In certain instances, the 2-D extensive catalyst 102 may have a thickness dimension in a range of 1 to 50 or particularly 2 to 20 atomic layers, while the extent of x and y dimensions may be 100 nanometers or greater.

The porous substrate material for forming the substrate bulk 320 can be any suitable materials. In certain instances, the substrate material includes metals, metal alloys, ceramics, polymers, carbon-containing materials, or combinations thereof. In certain particular instances, the substrate material is electronic conductive.

The form and extent of contact between the pore surface 324 and the 2-D extensive catalyst 326 may vary. For instance, as shown in region C.1 of FIG. 3C, the 2-D extensive catalyst layer 326 contacts a portion the pore surface 324; as shown in region C.2 of FIG. 3C, the 2-D extensive catalyst layer 326 may cover the entire pore surface 324 and the pore 322 may contain one or more ionomers and/or porous carbon to assist with proton and gas transport and water management; as shown in region C.3, the pore 322 contacts 2-D catalyst layer 326 and contains one or more ionomers. As shown in region C.4, the pore 322 contains the 2-D catalyst layer 324 and is filled with water and ionomers. As shown in region C.5, the pore surface 324 contacts two or more spaced apart patches 328 of the 2-D extensive catalyst layer 326. As depicted in region C.6 shown in FIG. 3C, the substrate 320 further includes a plurality of wires 330 extending longitudinally from the pore surface 324 and at least a portion of the wires 330 may be in contact with the 2-D extensive catalyst layer 326. As shown in region C.7, secondary pores may be provided, independently or in addition to the pores 322, to assist with reactant transport and water management. In certain instances, the secondary pores can be natural pores integral to the substrate 320, wherein the pores 322 can be later formed in and around the substrate 320 that already has the secondary pores show in region C.7.

Referring back to FIG. 3A, the catalyst assembly has a substantially constant catalyst concentration profile along a thickness dimension "T". In one or more embodiments, the term "substantially constant" refers to the distribution of the catalyst 326 such that a catalyst concentration difference between any two portions of the bulk substrate 320 along the dimension "T" is no greater than 50 percent, 40 percent, 30 percent, 20 percent, 10 percent, 5 percent, or 1 percent.

Referring back to FIG. 3C, the wires 330 can be formed via anodized aluminum oxidation according to the example(s) described herein.

In one or more embodiments, wires 330 may include wires of variable lengths in the micrometer and/or nanometer ranges. As a result, the wires 330 may include microwires and/or nanowires. In certain instances, the term "wires" may refer to any nano-structures of any suitable shape to provide added surface area. In certain other instances, the term "wires" does not necessarily indicate that the wires 330 are of dimensions in nanometer scale. The wires 300 may have an average diameter in nanometer scale and/or an average length in micrometer scale. In yet certain other instances, the term "wires" may refer to nano-structures floating within the ionomer mixture contained in the pores and not necessarily contacting or attaching to any pore surface.

Figure 4A:
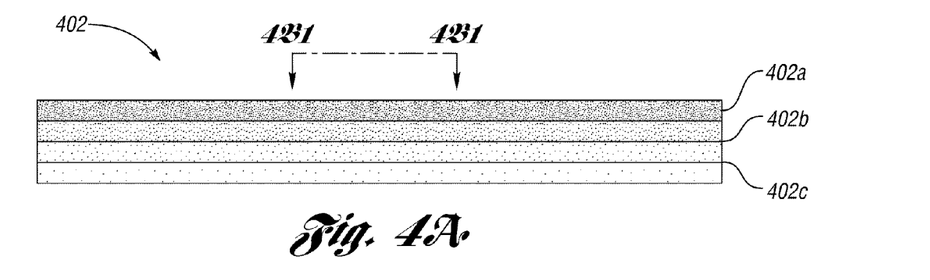
FIG. 4A depicts a cross-sectional view of a porous substrate according to yet another embodiment.

In another embodiment, and as depicted in FIG. 4A, a variation of the catalyst assembly 302 is generally shown at 402. The catalyst assembly 402 includes two or more layers, for instance 402a, 402b, and 402c. In certain instances, an average pore size of layer 402c is greater than an average pore size of layer 402b, which is further greater than an average pore size of layer 402a. Without wanting to be limited to any particular theory, it is believed that the layered catalyst assembly 402 helps provide a built-in porosity gradient, catalyst loading/type gradient, a built-in water transport gradient, and/or proton transport gradient, which can further be modified by varying pore sizes, catalyst loading/type, and/or thicknesses of the layers 402a, 402b, or 402c.

Figure 4B:
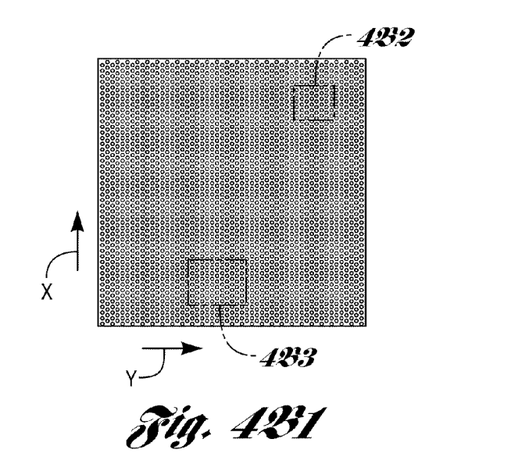
Figure 4B:
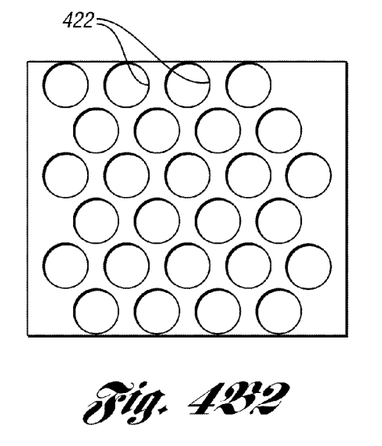
Figure 4B:
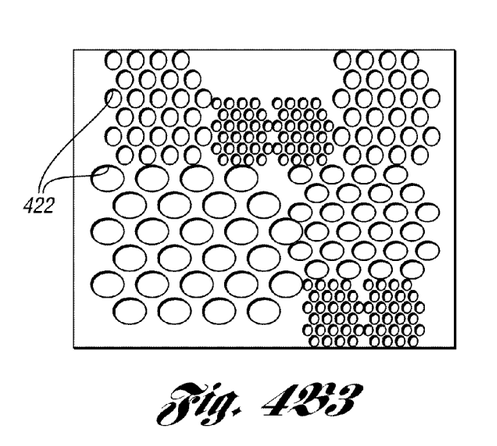

FIG. 4B1 depicts a sectional plain view of the catalyst assembly 402 taken along the lines 4B-4B. FIG. 4B2 depicts an enlarged view of a portion 4B2 shown in FIG. 4B1, showing a plurality of pores 422 being substantially uniform in shape and/or dimension. In a variation, and as depicted in FIG. 4B3 which shows an enlarged view of portion 4B3 of FIG. 4B1, pores 422 can have different sizes and/or different shapes along an x-axis or a y-axis and z-axis direction.

Figure 5A:
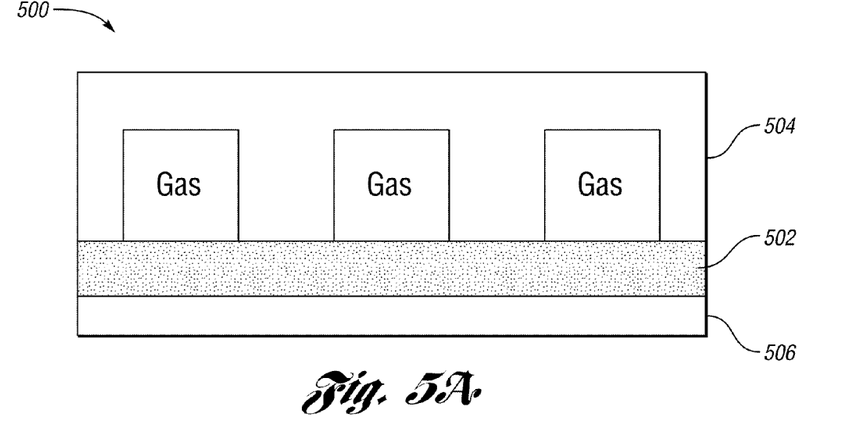
FIG. 5A depicts a cross-sectional view of an electrochemical cell according to yet another embodiment.

In yet another embodiment, and as depicted in FIG. 5A, an electrochemical cell 500 is provided as a variation to the electrochemical cell 300 of FIG. 3A. In this design, the electrochemical cell 500 includes a gas flow field 504, a catalyst assembly 502 contacting the gas flow field 504, and optionally a membrane 506 disposed next to the catalyst assembly 502. This design effectively eliminates the need for a gas diffusion layer (GDL) such as GDL 308 and therefore reduces manufacture and maintenance costs accordingly. In certain instances, the catalyst assembly 502 includes one or more carbon materials such as carbon black, carbon fiber, carbon powder, and carbon rods. Without wanting to be limited to any particular theory, it is believed that the carbon materials help increase electronic conductivity and hence the transport of electrons across the catalyst assembly 502.

In one or more embodiments, the term "carbon" or "carbon material" generally refers to a material which could increase reactant transport due to its porosity and/or which has electrical conductivity. The pores within the carbon material may be optionally filled with an ionomer mixture to assist with proton transport.

Figure 5B:
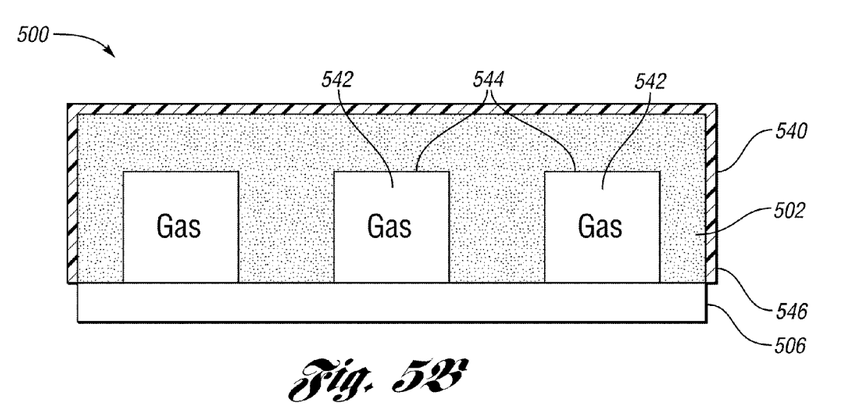
FIG. 5B depicts a cross-sectional view of a variation to the electrochemical cell of FIG. 5B.

In yet another embodiment, and as depicted in FIG. 5B, the electrochemical cell 500 may be varied such that the gas flow channels 542 are formed within the catalyst assembly 502, together forming a catalyst-flow channel complex 540. In certain instances, open cavities may be created within the catalyst assembly 502 to form the gas flow channels 542. In certain other instances, the gas flow channels 542 are separated from the catalyst assembly 502 with a separator 544. Without wanting to be limited to any particular theory, it is believed that the separator 544 helps even the gas distribution from the gas flow channels 542 out to the catalyst assembly 502. It is also believed that the separator 544 helps alleviate risk of collapsing of the gas flow channels 542. The separator 544 can be formed of any suitable materials. In certain particular instances, the separator 544 includes a carbon paper, a carbon cloth, or combinations thereof. In certain other instances, a sealer 546 may be disposed to the external of the catalyst-flow channel complex 540 to reduce or eliminate gas leak via the pores present within the catalyst assembly 502.

Figure 5C:
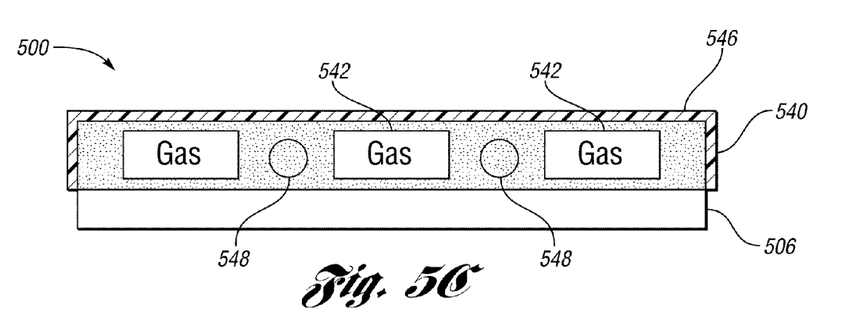
FIG. 5C depicts a cross-sectional view of a variation to the electrochemical cell of FIG. 5B.

In yet another embodiment, and as depicted in FIG. 5C, coolant channels 548 can be formed in addition to gas flow channels 542 along portions of the catalyst-flow channel complex 540 to provide cooling or heating for fuel cell operation. In this configuration, the catalyst-flow channel complex 540 can be made relatively thin to deliver additional cost or energy benefits by maintaining the entire complex 540 volumetrically more compact.

Having generally described this invention, a further understanding can be obtained by reference to certain specific examples which are provided herein for purposes of illustration only and are not intended to be limiting unless otherwise specified.

EXAMPLES

Example 1

Integrated Catalyst Block with GDL and Gas Flow Field

A serpentine flow field from Fuel Cell Technologies (FCT) with 5 square centimeter active area is used in an anode side. A gas diffusion electrode (GDE) from E-TEK (12-W series) with 5 grams Pt per square meter is used at the anode side and Nafion 117 is used as the membrane.

Used in the cathode side is a porous plate (Poco-graphite Inc.) equipped with embedded flow fields and the catalyst layer supported on one side of porous plate. The dimensions for the porous plate are 1.9"×1.9"×⅜" with 75% total porosity and 95% open porosity.

In one or more embodiments, the term "open porosity" refers to portions of pores in which fluid flow takes place. Open porosity does not include dead-ended pores or non-connected pores. The term "total porosity" refers to total pore volume covering both the pores for effectively carrying out fluid flow and the dead-ended pores or non-connected pores.

The embedded flow field is created by drilling the porous plate according to FIGS. 6A to 6E. The pores present on the sides of the porous plate are closed or sealed off by applying glues such as epoxy and thereafter, only one gas flow input and one gas flow output are left for the porous plate.

Figure 6A:
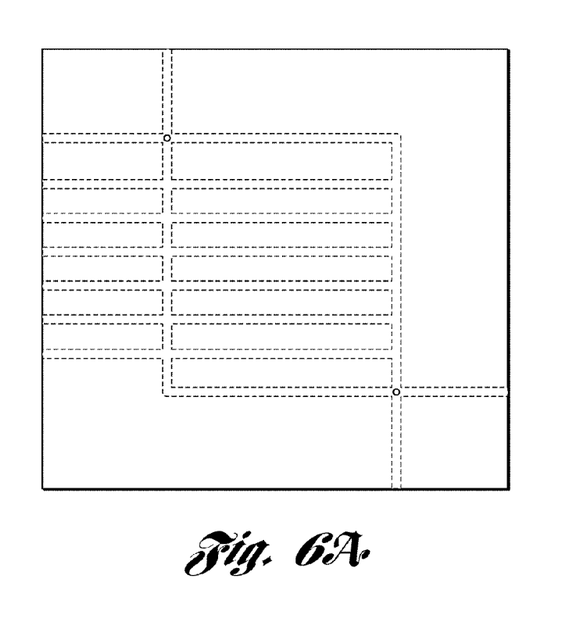
FIGS. 6A to 6E depict various views of a porous plate construction with a thin film catalyst according one or more examples disclosed herein.
Figure 6B:
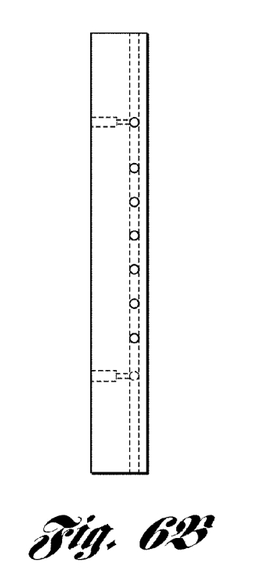
Figure 6C:
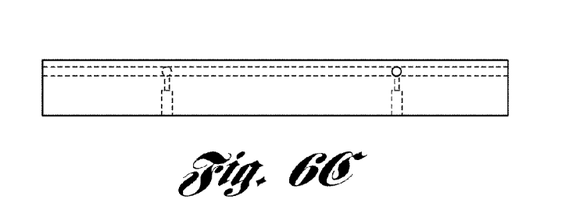
Figure 6D:
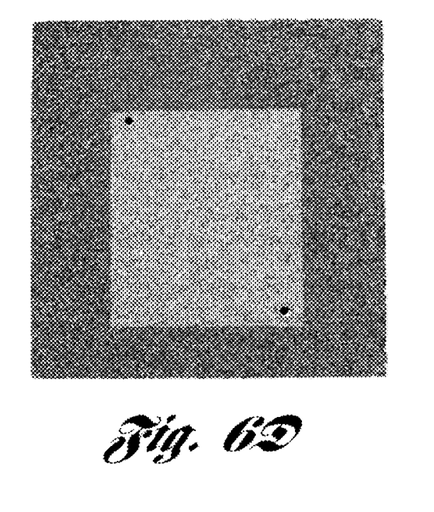
Figure 6E:
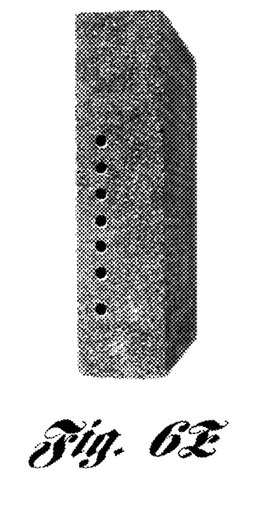

A thin film of Pt of approximately 25 nanometers in thickness is applied onto the porous plate using AC sputtering. FIGS. 6D and 6E depict a plan view and a side view of the porous plate, respectively, wherein the thin Pt film is illustrated as a relatively lighter center portion of approximately 5 square centimeters in area. The Pt loading may be increased by using other or additional Pt deposition methods including Atomic Layer Deposition or CVD wherein precursor gas can penetrate all the way into the smallest pores of the porous plate.

Figure 7:
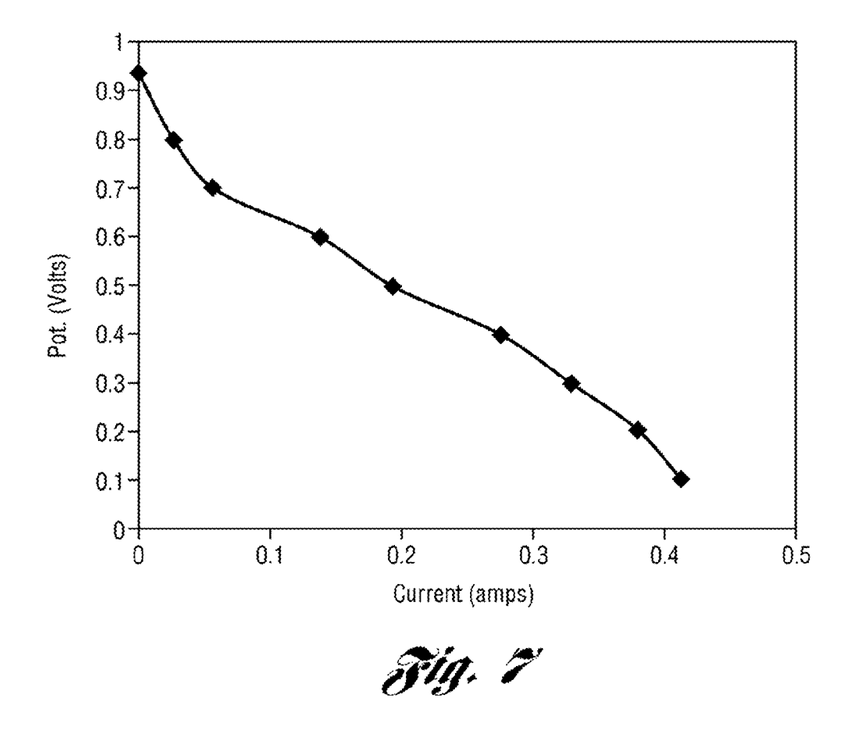
FIG. 7 depicts a voltage-to-current plot (or polarization curve) derived from the porous plate construction in relation to FIGS. 6A to 6E.
Figure 8A:
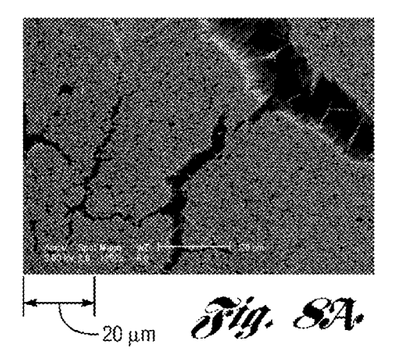
FIGS. 8A to 8E depict SEM (scanning electron microscope) images in increasing magnification of wires generated for enhancing catalytic surface area according to yet another embodiment.
Figure 8B:
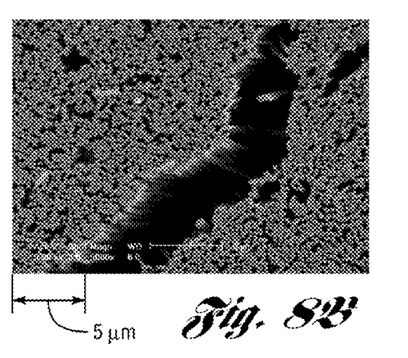
Figure 8C:
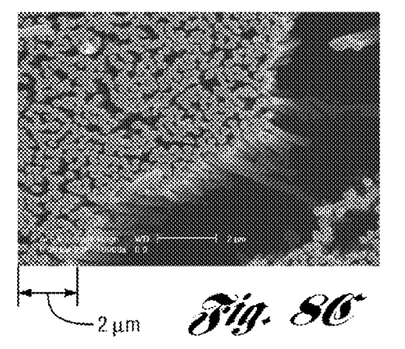
Figure 8D:
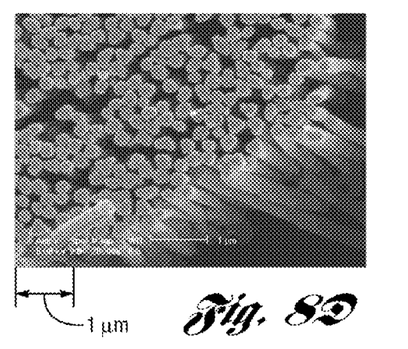
Figure 8E:
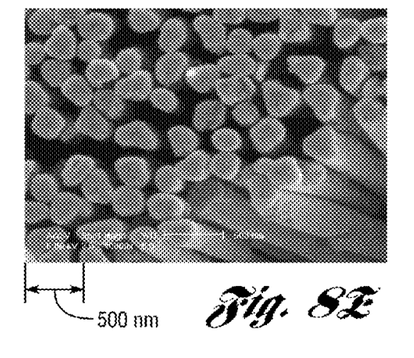

In this example, the flow rates are 300/1000 sccm hydrogen and air for the anode and cathode, respectively, and the cell is operated with no back pressure. The polarization curve for this system is depicted in FIG. 7, showing an OCV (open circuit voltage) of 0.94 volts which proves the realization of proper ORR activity.

Example 2

Forming the Wires

Several methods can be used to manufacture the wires as described herein. Among them are evaporation-condensation, vapor-liquid-solid (VLS) growth, and template based.

In this example, commercially available templates such as anodized alumina membrane (AAM) and radiation track-etched polycarbonate (PC) membranes are used. FIGS. 8A to 8E depict SEM images, with increasing magnification levels, of a plurality of wires grown using an anodic alumina oxide (AAO) membrane.

Figures 9A, 9B, 9C, 10A, 10B:
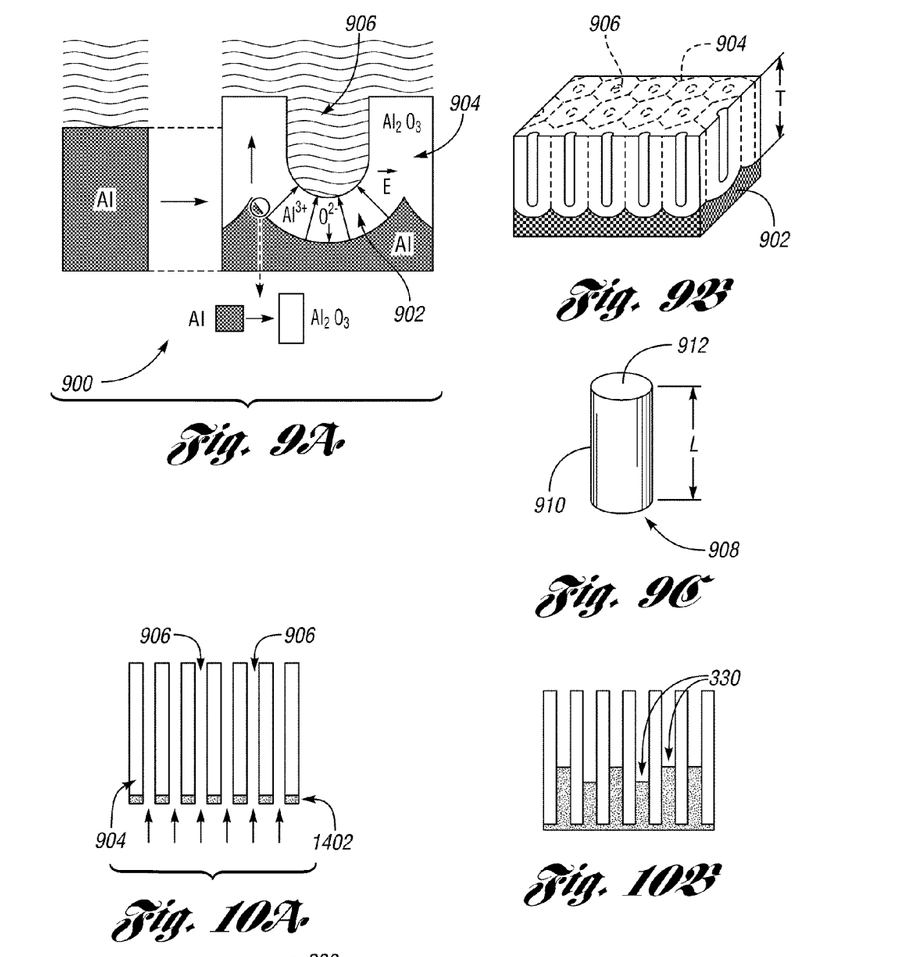
FIGS. 9A to 9C depict a schematic view of process steps for forming the wires according to yet another embodiment.
FIGS. 10A to 10D depict a schematic view of process steps for forming the wires using the template of FIGS. 9A to 9C.

Commonly used alumina membranes having uniform and parallel pores are produced by the anodization of aluminum sheets or films in solutions of sulfuric, oxalic or phosphoric acid. As shown in FIGS. 9A to 9B, the pores 906 can be arranged in a regular hexagonal array as seen in FIG. 9B, and as many as $10^{11}$ pores/cm$^2$ can be obtained. Pore sizes range from 10 nm to 100 μm. After formation of the pores, the barrier oxide layer 902 at the bottom of the pores 906 is removed by dissolution in sodium hydroxide and mechanical agitation.

Figure 10C:
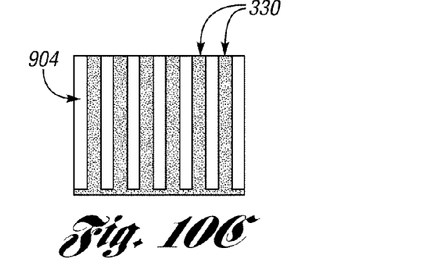
Figure 10D:
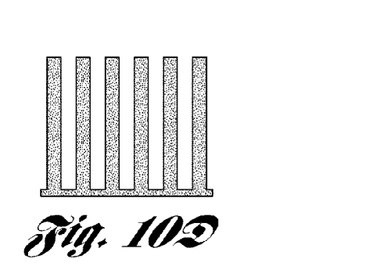

Membrane etching and catalyst electro-deposition follow thereafter according to FIGS. 10A to 10D. As depicted in FIG. 10A, a conductive layer 1402 of copper or gold is sputtered onto the bottom of the substrate 904; as depicted in FIG. 10B, the wires 330 extend in length as electro-deposition continues; as depicted in FIG. 10C, the ends of the wires 330 are polished for desirable smoothness; and as depicted in FIG. 10D, the wires 330 are obtained by removing and etching the membrane 904 by the use of a base such as NaOH.

Example 3

Specifications Testing of the Wires

Copper wires are grown in an electrochemical cell with templates made of Anodic Alumina Oxide (AAO), with pore diameters of 200 nm, 150 nm and 50 nm. Scanning Electron Microscope (SEM) images are shown in FIGS. 8A to 8E. FIGS. 8A to 8E depict an enlarged view of a portion of the catalyst region 104 of FIG. 5B, the portion containing a plurality of wires extending from a surface of the portion, with a magnification of 1,250×, 5,000×, 10,000×, 20,000×, and 40,000× respectively.

Table 1 tabulates selected specifications of the wires grown according to the example. Several of the test specifications as referenced in Table 1 are defined according to the following. With reference to FIG. 9B, a plurality of pores 906 are created within the AAO membrane 904, which is provided with an average thickness indicated as "T." The average thickness "T" of the AAO membrane 904 as employed in this example is about 47-50 μm. For illustration purposes, and as depicted in FIG. 9C, a wire generally shown at 908 is grown to its length "L" within each of the pores 906. The length "L" of the nanowires can be adjusted by controlling the extent of its growth; however, the length "L" should be no greater than the average thickness "T" for the AAO membrane 904. As referenced in the Table 1, pore density is the number of pores 906 per cm$^2$ of the AAO membrane 904. In this example, the growth of the wires 330 can be controlled such that the wires 330 have an average length of 1-1.3 μm. As referenced in the Table 1, peripheral area is the area shown at 910; basal area is the area shown at 912; and the total surface area represents the sum of the basal area and the peripheral area times the total number of the wires or the total number of the pores per cm$^2$, plus the free area on the substrate where no wire is grown.

TABLE 1

Selected Specifications of the wires Grown

| Pore Diameter nm | AAO Membrane Thickness μm | Pore Density #/cm$^2$ | wire Length μm | Total Surface Area cm$^2$/cm$^2$ growth surface |
|---|---|---|---|---|
| 150 | 50 | $2 \times 10^9$ | 1.3 | 12.2 |
| 73 | 47 | $4 \times 10^9$ | 1 | 9.2 |
| 55 | 50 | $5 \times 10^9$ | 1 | 8.6 |
| 35 | 49 | $1 \times 10^{10}$ | 1 | 11.0 |
| 13 | 50 | $1 \times 10^{11}$ | 1 | 40.8 |

It is noted that the total surface area shown in Table 1 is a function of the pore diameter, the pore density, and length of the wires grown.

Example 4

Surface Area Analysis Based on Porosity and Wire Structures

Table 2 demonstrates calculated surface area of a porous plate such as one of FIGS. 6A-6E, assuming substantially uniform pore size (40 microns) and pore distribution. Additional surface area may be provided by employing wires in the porous plate. For instance, to obtain a total surface area of 50 cm$^2$/cm$^2$, employed there are wires with 3.8 microns in length and 55 nanometers in diameter with specifications detailed in Table 1. The resultant porous plate is provided with a total surface area of 50 cm$^2$/cm$^2$, of which 15 cm$^2$/cm$^2$ correlating to the pores of the porous plate and the rest of 35 cm$^2$/cm$^2$ correlating to the wires.

TABLE 2

| porous plate thickness | 200 microns |
|---|---|
| average pore diameter | 40 microns |
| Porosity | 75 percent |
| volume per square centimeter of the porous plate | 0.02 cm$^3$/cm$^2$ |
| volume of voids per square centimeter of the porous plate | 0.015 cm$^3$/cm$^2$ |
| average volume of one pore | $2.5 \times 10^{-7}$ cm$^3$ |
| number of pores per square centimeter of the porous plate | 59,714 |
| inner surface area of the pores | 15 cm$^2$/cm$^2$ |

Table 3 demonstrate calculated surface area of a variation of the porous plate referenced in Table 3, wherein the average pore diameter is decreased from 40 microns to 10 microns. In this example, the calculated total surface area is increased to 60 cm²/cm².

TABLE 3

| | |
|---|---|
| porous plate thickness | 200 microns |
| average pore diameter | 10 microns |
| Porosity | 75 percent |
| volume per square centimeter of the porous plate | 0.02 cm³/cm² |
| volume of voids per square centimeter of the porous plate | 0.015 cm³/cm² |
| average volume of one pore | $1.6 \times 10^{-8}$ cm³ |
| number of pores per square centimeter of the porous plate | 955,414 |
| inner surface area of the pores | 60 cm²/cm² |

While the best mode for carrying out the invention has been described in detail, those familiar with the art to which this invention relates will recognize various alternative designs and embodiments for practicing the invention as defined by the following claims.

What is claimed:

1. A catalyst assembly comprising:
   a porous substrate material including an external surface and a substrate bulk including a network of diffusive pores and first and second substrate layers respectively having first and second average pore sizes different from one another; and
   a two dimensional extensive catalyst supported on at least a portion of the network of diffusive pores to provide a substantially constant catalyst concentration profile along a thickness of the substrate bulk.

2. The catalyst assembly of claim 1, wherein the network of diffusive pores includes an internal pore surface supporting at least a portion of the two dimensional extensive catalyst.

3. The catalyst assembly of claim 1, wherein the two dimensional extensive catalyst has a thickness dimension of 1 to 50 atomic layers.

4. The catalyst assembly of claim 1, wherein the porous substrate material is electronically conductive.

5. The catalyst assembly of claim 1, further comprising a volume of electrolyte adjacent the porous substrate material, the volume of electrolyte including a solvent content of no greater than 5 percent by weight.

6. The catalyst assembly of claim 1, wherein the substrate bulk further includes a third substrate layer disposed next to the second substrate layer and having a third average pore size, the second substrate being positioned between the first and the third substrate layers.

7. The catalyst assembly of claim 6, wherein the first average pore size is smaller than the second average pore size, and the second average pore size is smaller than the third average pore size.

8. The catalyst assembly of claim 1, wherein the two dimensional extensive catalyst contacts one or more pores of both the first and second substrate layers.

9. The catalyst assembly of claim 2, wherein the two dimensional extensive catalyst includes two or more spaced apart catalyst patches each contacting the internal pore surface.

10. The catalyst assembly of claim 1, wherein the substrate bulk further includes a plurality of wires extending longitudinally from an internal pore surface.

11. The catalyst assembly of claim 10, wherein the two dimensional extensive catalyst contacts at least a portion of the plurality of wires.

12. A catalyst assembly comprising:
    a porous substrate material including an external surface and a substrate bulk including a network of diffusive pores and a plurality of wires extending longitudinally from an internal pore surface of the network of diffusive pores; and
    a two dimensional extensive catalyst supported on at least a portion of the network of diffusive pores to provide a substantially constant catalyst concentration profile along a thickness of the substrate bulk.

13. The catalyst assembly of claim 12, wherein the two dimensional extensive catalyst has a thickness dimension of 1 to 50 atomic layers.

14. The catalyst assembly of claim 12, wherein the porous substrate material is electronically conductive.

15. The catalyst assembly of claim 12, wherein the substrate bulk further includes first and second substrate layers respectively having first and second average pore sizes, the first average pore size being smaller than the second average pore size.

16. The catalyst assembly of claim 15, wherein the two dimensional extensive catalyst contacts one or more pores of both the first and second substrate layers.

17. The catalyst assembly of claim 12, wherein the two dimensional extensive catalyst contacts at least a portion of the plurality of wires.

18. An electrochemical cell comprising:
    a catalyst assembly including a porous substrate material including a substrate bulk and an external surface, the substrate bulk including a network of diffusive pores and a plurality of wires extending longitudinally from an internal pore surface of the network of diffusive pores;
    a two dimensional extensive catalyst supported on at least a portion of the network of diffusive pores to provide a substantially constant catalyst concentration profile along a thickness of the substrate bulk; and
    a volume of electrolyte positioned next to the catalyst assembly and having a solvent content of no greater than 5 percent by weight.

19. The electrochemical cell of claim 18, wherein the porous substrate material is electronically conductive.

* * * * *